Nov. 21, 1939.  W. F. DEHUFF  2,181,079

MIXING MACHINE

Filed Oct. 30, 1937  4 Sheets-Sheet 1

INVENTOR
WALTER F. DEHUFF
BY George S. Hastings
ATTORNEY

Nov. 21, 1939.  W. F. DEHUFF  2,181,079
MIXING MACHINE
Filed Oct. 30, 1937  4 Sheets-Sheet 2
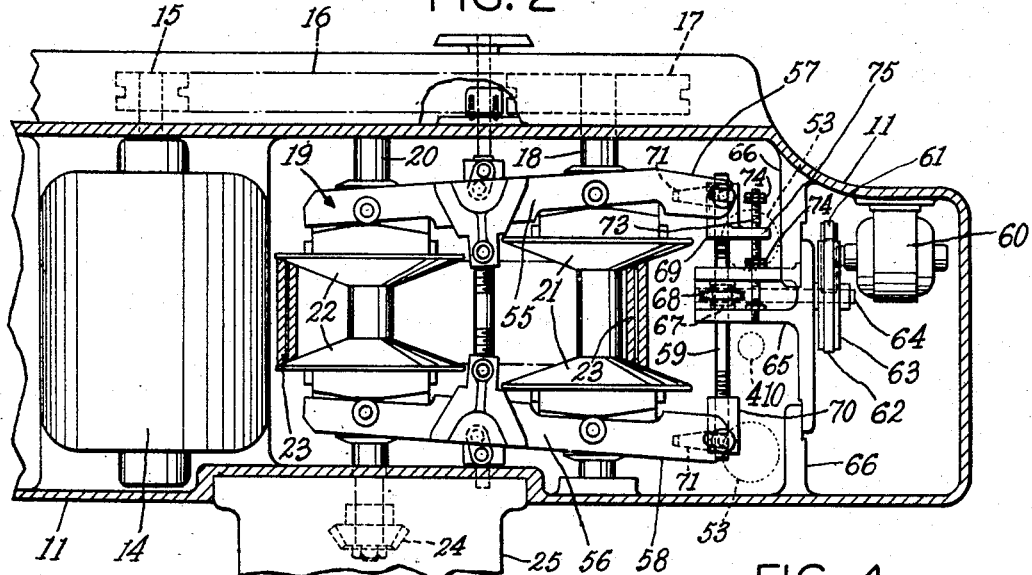
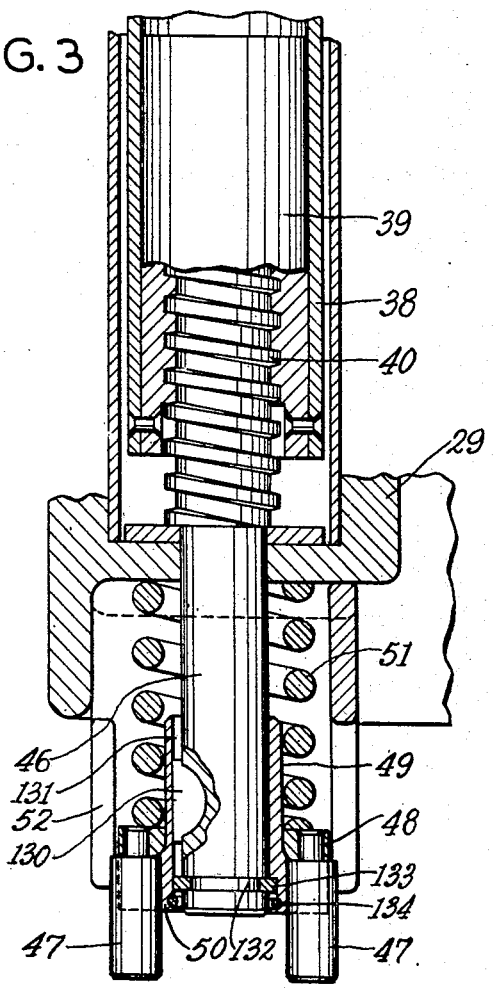
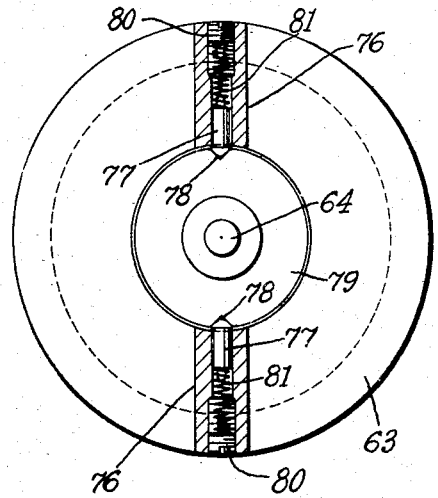
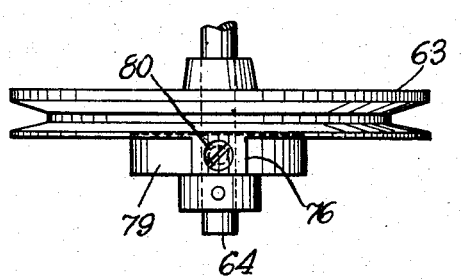
INVENTOR
WALTER F. DEHUFF
BY *Georges Hastings*
ATTORNEY Nov. 21, 1939.  W. F. DEHUFF  2,181,079
MIXING MACHINE
Filed Oct. 30, 1937   4 Sheets-Sheet 3

INVENTOR
WALTER F. DEHUFF
BY *Georges S. Hastrup*
ATTORNEY

Nov. 21, 1939.  W. F. DEHUFF  2,181,079
MIXING MACHINE
Filed Oct. 30, 1937    4 Sheets-Sheet 4

INVENTOR
WALTER F. DEHUFF
BY *Georges Hastings*
ATTORNEY

Patented Nov. 21, 1939

2,181,079

UNITED STATES PATENT OFFICE 2,181,079

MIXING MACHINE

Walter F. Dehuff, Glen Rock, Pa., assignor to American Machine & Foundry Company, a corporation of New Jersey Application October 30, 1937, Serial No. 171,959

32 Claims. (Cl. 259—102)

This invention relates to mixing machines, and more particularly to mixing machines of the vertical type in which a mixing receptacle is positioned beneath a rotating beater so that the latter can revolve in the receptacle to mix a batch to the proper consistency.

The general practice in vertical mixing machines, heretofore, has been to mount the beater for rotation in a fixed head and raise and lower the bowls towards and from the beater. Since the beater would project into the bowls even in lowered position, every time a bowl had to be removed from the machine for emptying, the beater would have to be disconnected from its head. According to the machine of the present invention both the beater supporting head and the bowl support are individually movable towards and from each other with the net result that the beater can be raised clear of a lowered bowl, and the latter can be removed from the machine and emptied without the necessity of disconnecting the beater. Hence, this construction makes it possible to effect much quicker mixing, to use larger bowls, since the heavy beaters need not be disconnected from their rotary supports every time a mixing operation is concluded, which allows bowls to be interchanged and repositioned for mixing more rapidly and results in a more flexible and efficient machine than heretofore known.

In the illustrated embodiment there is shown a machine capable of handling large bowls of 340 quart capacity and the machine has been especially designed to meet all the problems incident to the efficient handling of such large bowls. The machine because of the novel telescoping construction of its parts is relatively small in comparison to the size of bowl handled thereon, and the beater is always within easy reach of the operator for removal and replacement or for cleaning. Furthermore, with the use of adapters smaller bowls and smaller beaters for use therewith can be mounted in the machine and operated efficiently to produce extremely satisfactory results.

It is an object of the invention, therefore, to provide a novel mixing machine in which both the beater supporting head and the mixing receptacle supports are independently movable to and from each other.

It is a further object of the invention to provide an improved beating machine in which the beater supporting head and bowl support are movable toward and from each other and in which a speed control is provided for the beater.

The invention also includes novel mechanism for effecting a change in speed of the beater so that the speed is always well within the control of the operator.

The invention also consists in the provision of novel mechanism for controlling the limits of vertical movement of the beater head and bowl support.

This invention also consists in the provision of automatically acting control and driving mechanism for terminating the upward and downward movement of the beater head and bowl support.

It is also an object of the invention to provide means for raising and lowering a bowl support in which the support has means for absorbing the shock of the descent thereof at its lowermost limits.

It is also an object of this invention to provide means for safe-guarding an operator against injury by providing means for preventing rotation of the beater unless the beater head and bowl support carrying the bowl have been moved substantially into their operative beating position.

According to this invention means have also been provided for safe-guarding the operator against injury by the provision of mechanism which is automatically controlled for terminating or interrupting the beater rotation during certain phases of the machine operation, such for instance as when the bowl support is moving up or down within certain limits.

It is also an object of the invention to make it impossible to start the rotation of the beating head until the bowl support is approaching the limits of its upward movement.

It is also an object of the invention to provide means for automatically terminating rotation of the beater when the bowl support starts to descend.

It is also an object of the invention to provide a mixing machine capable of operating with bowls ranging up from relatively small bowls to very large bowls of 340 quart capacity or larger. When using a smaller bowl than that which the bowl support of the machine is designed to seat, a suitable adapting device is associated with the support.

It is a further object to provide mechanism for lifting and lowering the beater head and the bowl support in which the movement of the head and bowl are effected successively to position them in mixing or separated relationship as the case may be.

It is an additional object of the invention to provide mechanism for preventing operation of the speed change device until the beater motor is running.

With these and other objects not specifically mentioned in view, the invention consists in certain combinations and constructions which will be described hereinafter and then set forth specifically in the claims appended hereunto.

In the accompanying drawings which form a part of this specification, and in which like characters of reference describe the same or like parts:

Fig. 2 is a plan view of the variable speed driving mechanism;

Fig. 3 is an enlarged detail view of one of the members which raise and lower the bowl saddle and also the upper portion of the machine;

Fig. 4 is an end view of the slip pulley unit constituting part of the variable speed control mechanism;

Fig. 5 is a top plan view of Fig. 4;

Figure 1:
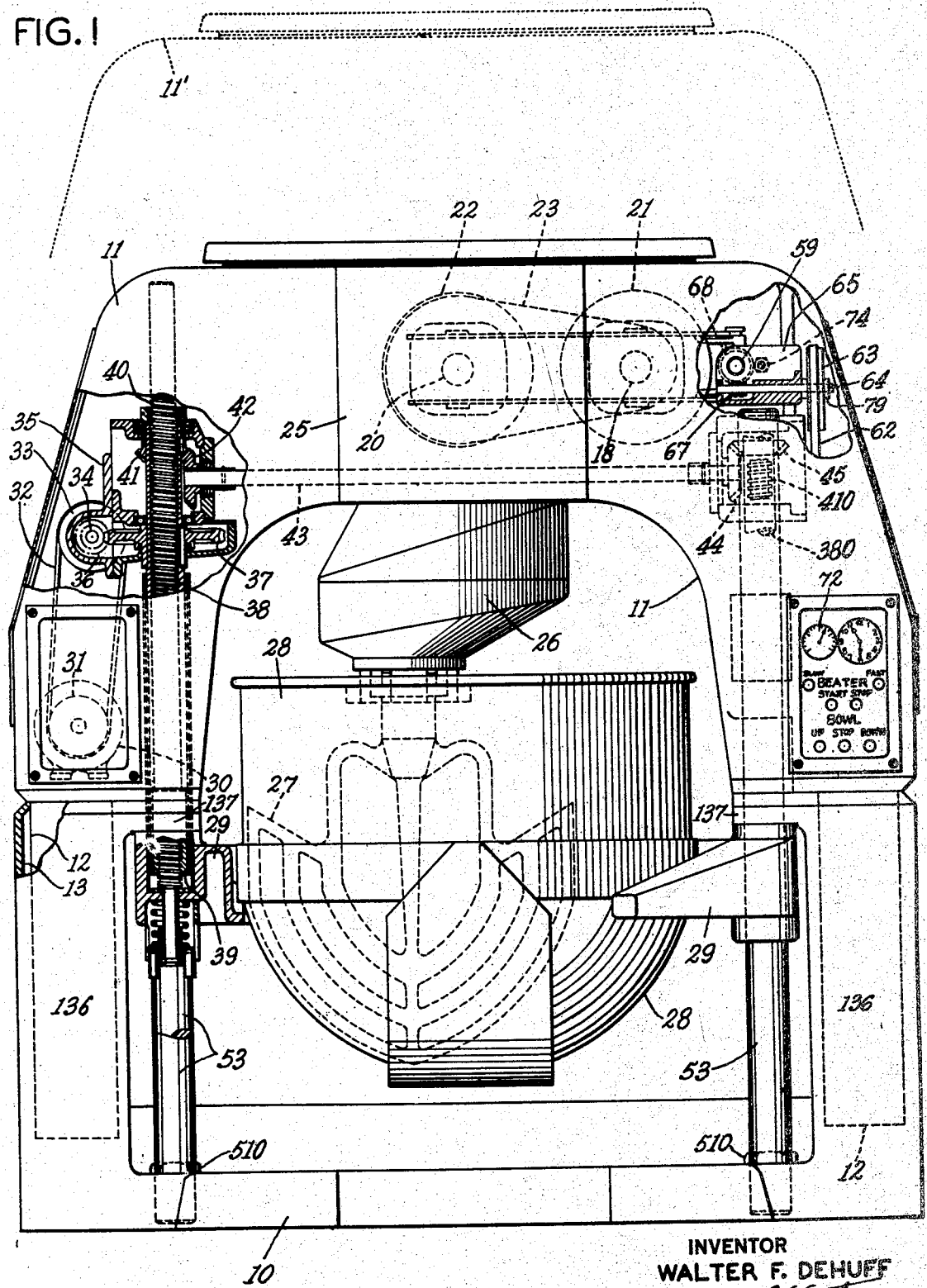
Fig. 1 is a front view of the improved mixing machine.

Referring to the drawings, the machine consists of a base 10 supporting a movable head or standard 11. Head 11 is provided with columns 12 secured thereto adapted to slide in the openings 13 of base 10.

The upper part of head 11 supports a motor 14, Fig. 2, driving a sprocket wheel 15 in mesh with a chain 16 running over a sprocket wheel 17, fixed on driving shaft 18 of the variable speed mechanism indicated generally at 19 which controls the speed of rotation of the beater. The driving shaft 18 and a driven shaft 20 of this mechanism splinably support respective pairs of pulleys 21 and 22, each pair consisting of complementary conical parts which together form a wedged-shaped groove in which seats an endless belt 23.

A bevel gear 24 mounted on shaft 20 meshes with a bevel gear (not shown) within the casing 25. This drive imparts motion to a gear train (not shown) within the casing 26, Fig. 1, and rotates the eccentrically mounted planetary beater head 27.

The mechanism confined in casing 26 is fully described in my Patent No. 1,781,321, granted November 11, 1930, and, therefore a more detailed showing or description of the same is deemed unnecessary in the present application.

In Fig. 1, the beater head 27 and bowl 28 are shown in mixing position in which the depending legs of head 11 rest on the tops of uprights 136, and saddle 29 engages the bottom of abutments 137 of the uprights. When the ingredients in the bowl are thoroughly mixed, the operator of the machine presses the "down" button on the control panel which results in the following operation: The saddle 29 which embraces the bowl 28 is automatically lowered by means to be described hereinafter and the bowl which is detachably supported thereon is seated in a dolly (not shown) which may be of the same construction and type as disclosed in my co-pending application, Serial No. 90,039 for Bowl handling mechanism for mixing machines, filed July 10, 1936. The bowl having reached its lowermost positions, the head 11 is then caused to ascend as illustrated by the dotted line showing 11', Fig. 1. In ascending it is evident that the beater will be lifted from the bowl, and that the continued ascent of the head will move the beater upward a distance sufficient to clear the bowl 28 when the latter is in its down position. This construction is particularly desirable since it raises the beater clear of the bowl and makes it unnecessary for the operator to reach in and disconnect the beater from its support and scrape it before the bowl can be removed for further operation and a new bowl placed for raising into mixing position. By the elimination of these disadvantages a marked increase in efficiency in bowl and beater handling and mixing results.. The bowl which is resting in the dolly can be readily transported from the mixer for emptying or any other operation, and another bowl can be placed on saddle 29 to be raised into position for coaction with the beater. At a predetermined point, during the descent of the bowl, the flow of current to the motor 14 is automatically discontinued by mechanism hereinafter described, thereby stopping the rotation of the beater head. This feature greatly reduces the chance of injury to the operator by the beater when it moves to its "up" position.

The machine is restored to mixing position shown in Fig. 1, by pressing the "up" button on the control panel, whereupon the head 11 descends to its original position until its legs rest on uprights 136 and then the saddle 29 with a bowl 28 located thereon is raised until the saddle engages abutments 137 forming either a part of said uprights or mounted thereon. The operator then presses the beater "start" button which switches on motor 14 and imparts motion to the variable speed drive which rotates the beater, said beater continuing running until the desired consistency of the batch is obtained, whereupon the operator presses the "down" button on the control panel, thus lowering the bowl and automatically stopping the beater as heretofore mentioned. Of course, the rotation of the beater may be terminated manually at any time by merely pressing the "stop" beater button.

The bowl elevating and lowering motor 30, which in the illustrated embodiment is located at the lower left hand portion of head 11, drives a pulley 31 which by means of a belt 32 imparts motion to a pulley 33 secured on shaft 34 supported in worm housing 35. Shaft 34 also carries a worm 36 meshing with a worm wheel 37 which is keyed to a driving sleeve 38 provided at its lower end with an actuating nut 39. The nut 39 secured to the sleeve 38 in a manner as shown in Fig. 3, engages a spindle 40 which operates the head 11 and saddle 29. The upper end of sleeve 38 is provided with a bevel gear 41 meshing with a bevel gear 42 mounted on a horizontal cross shaft 43. The other end of shaft 43 is equipped with a bevel gear 44 meshing with a bevel gear 45 fastened to a sleeve 380 which is the same as sleeve 38. It will be understood that sleeve 380 is also provided with an actuating nut of the type shown in Fig. 3, which engages a spindle 410.

When the "down" button on the control panel is pressed, the motor 30 is started and through the above-described gearing, rotates sleeves 38 and 380 and also nuts 39. The rotation of nuts 39 results in the spindles being moved downwardly, thereby lowering the saddle and bowl which in the illustrated embodiment are anchored to the saddle. The shouldered end 46 of spindle 40 (Fig. 3) carries a shock absorbing device consisting of studs 47 secured to a plate 48 loosely mounted on a hub 49 of flange 50. A compression spring 51 arrested between the saddle 29 and plate 48 tends normally to hold the latter against flange 50 whereby studs 47 will be in advance of the end of spindle 40. It will be understood that spindle 410 is also equipped with a similar shock absorbing member. As the spindles approach their lowermost position the studs 47 contact members 510 provided in the base 10, Fig. 1, the continued descent of the spindle causing plates 48 to compress springs 51, thereby, taking the shock from the spindles before their base ends move into engagement with members 510. Plates 48 are prevented from turning by means of retainers 52 carried by the saddle.

When the saddle reaches its lowermost position the spindles are also now at their lowermost position and cause the revolving sleeves 38 and 380, as well as the nuts 39, to move upward on said spindles and in so doing the entire head 11 and its enclosed units also ascend as indicated by the dotted line showing in Fig. 1. The head ascends sufficiently to lift the beater head 27 clear of the bowl 28 thereby making it easy to remove the bowl from the machine without the necessity of detaching the beater. The head 11 and saddle 29 are guided in their vertical movements on upright columns 53 supported in the base 10 of the machine.

The variable speed mechanism is of the same general type as shown in my prior Patent No. 1,890,500, granted December 13, 1932, but with certain improvements. The pulleys 21 and 22 are co-ordinated as shown in said patent by means of bars 55 and 56 each being compositely constructed in such a manner that when the ends 57 and 58 or said bars are brought together or caused to recede by means of an actuating screw rod 59, the pulley parts of one pair will be brought toward one another while the pulley parts of the other simultaneously recede from one another causing the belt to ride out from the axis of one pair and simultaneously move in toward the axis of the other pair, thereby changing the speed ratio between the driving and driven members.

The screw rod 59 is actuated from a motor 60, Fig. 2, driving a pulley 61 which by means of a belt 62 drives a pulley 63 mounted on a shaft 64 supported in a bracket 65 attached to projecting lugs 66 of head 11. Shaft 64 is equipped with a worm 67 meshing with a worm wheel 68 mounted on rod 59 which is provided with right and left hand screw threads. Traveling nuts 69 and 70 are mounted on the respective screw threads of rod 59, are connected to the bars 55 and 56, respectively, which control the movements of the pulley parts, and transmit lateral movement to said bars to and from each other to vary the beater speed depending on the direction of movement of shaft 64. The nuts 69 and 70 are maintained in upright position by projecting tails 71 which engage the underside of the bars 55 and 56.

Motor 60 is operated by the slow and fast beater control push buttons on the control panel, the operator depressing either of the buttons to obtain the speed desired, at the same time watching the tachometer 72 on the control panel which registers the speed of the beater head; when the speed desired is obtained he releases the button and the drive maintains the selected speed until either of the buttons is again depressed.

To prevent damage to the endless belt 23 or jamming of the actuator screw 59, due to passing the minimum and maximum limits of the drive, an adjusting screw 73 is provided in bracket 65. Screw 73 has stop nuts 74, which are set for the minimum and maximum range, adapted to engage the projecting arm 75 of nut 69, when the arm 75 stops against either set of nuts, it causes pulley 63 to slip and thus stop the driving means of screw 59. Pulley 63 is provided with lugs 76 each of which carry spring actuated plungers 77 engaging V-slots 78, provided in the driven hub 79 fixed on shaft 64. Screws 80 are provided to adjust the tension of spring 81 bearing against plungers 77. It will be seen that plungers 77 will normally engage the V-slots and drive the pulley 63 until arm 75 engages one of the stops 74, thereby overcoming the tension of springs 81, and causing the plungers 77 to slip over member 79 to stop the driving means of screw 59.

Figure 6:
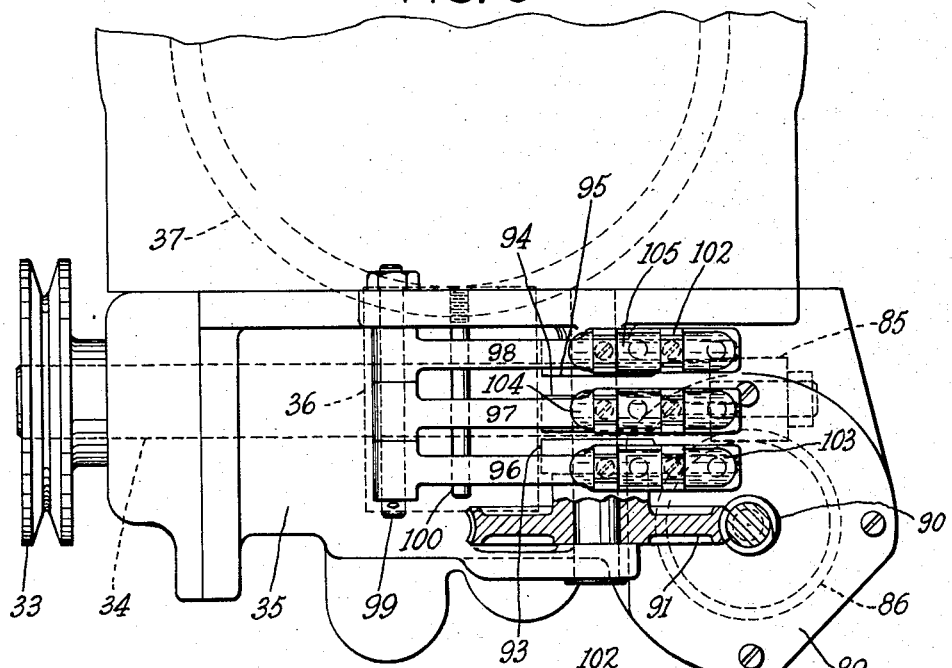
Fig. 6 is a partial plan view showing the means for actuating and controlling the up and down movement of the bowl saddle and upper portion of the machine and also the control for stopping the beater.
Figure 7:
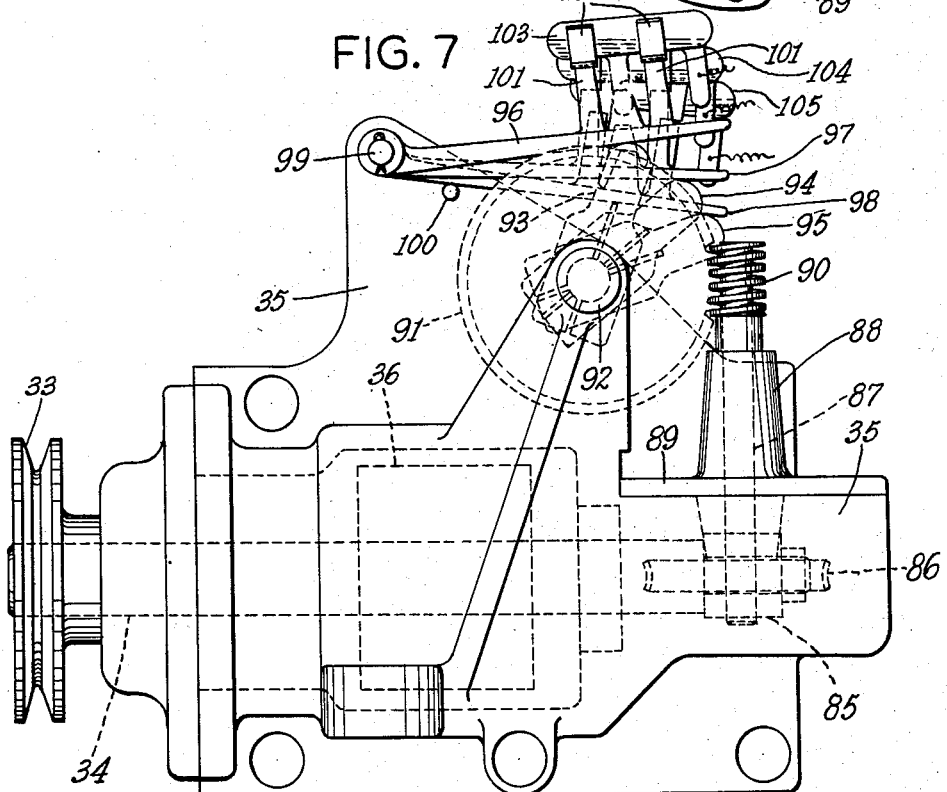
Fig. 7 is a side view of the Fig. 6.

Referring to Figs. 6 and 7, there is shown a shaft 34 provided at one end with a worm 85 meshing with a worm wheel 86 mounted on a vertical shaft 87 supported in a bearing 88 of the casing cover 89. Shaft 87, at its upper end, carries a worm 90 meshing with a worm wheel 91 fastened on shaft 92 supported in casing 35. Clamped to shaft 92 are cams or trip arms 93, 94 and 95 which engage arms 96, 97 and 98, respectively, pivotally mounted on a stud 99, which is suitably supported in the housing 35, said arms resting against a stop pin 100 when in their down position. It will be noted that trip arms 93 and 94 are adjustably secured on shaft 92, whereas arm 95 is securely fixed thereto. Since arm 95 controls the upper limit of movement of the upper frame 11 it is essential that this frame cannot be raised so far that it will be worked off its standards 53, whereby it might fall and due to its weight create serious damage. Accordingly, the upper limit thereof is carefully checked and then positively locked by mounting arm 95 in the manner above specified. Each of the arms 96, 97 and 98 have vertically extending posts 101 which are provided with clips 102 carrying mercury switches 103, 104 and 105, respectively. Each of these switches has a definite function. Switch 103 is provided for stopping the beater motor 14, switch 104 stops the motor 30 when the head 11 reaches its "up" position, and switch 105 stops motor 30 when the bowl 28 is in its "up" or mixing position.

Figure 8:
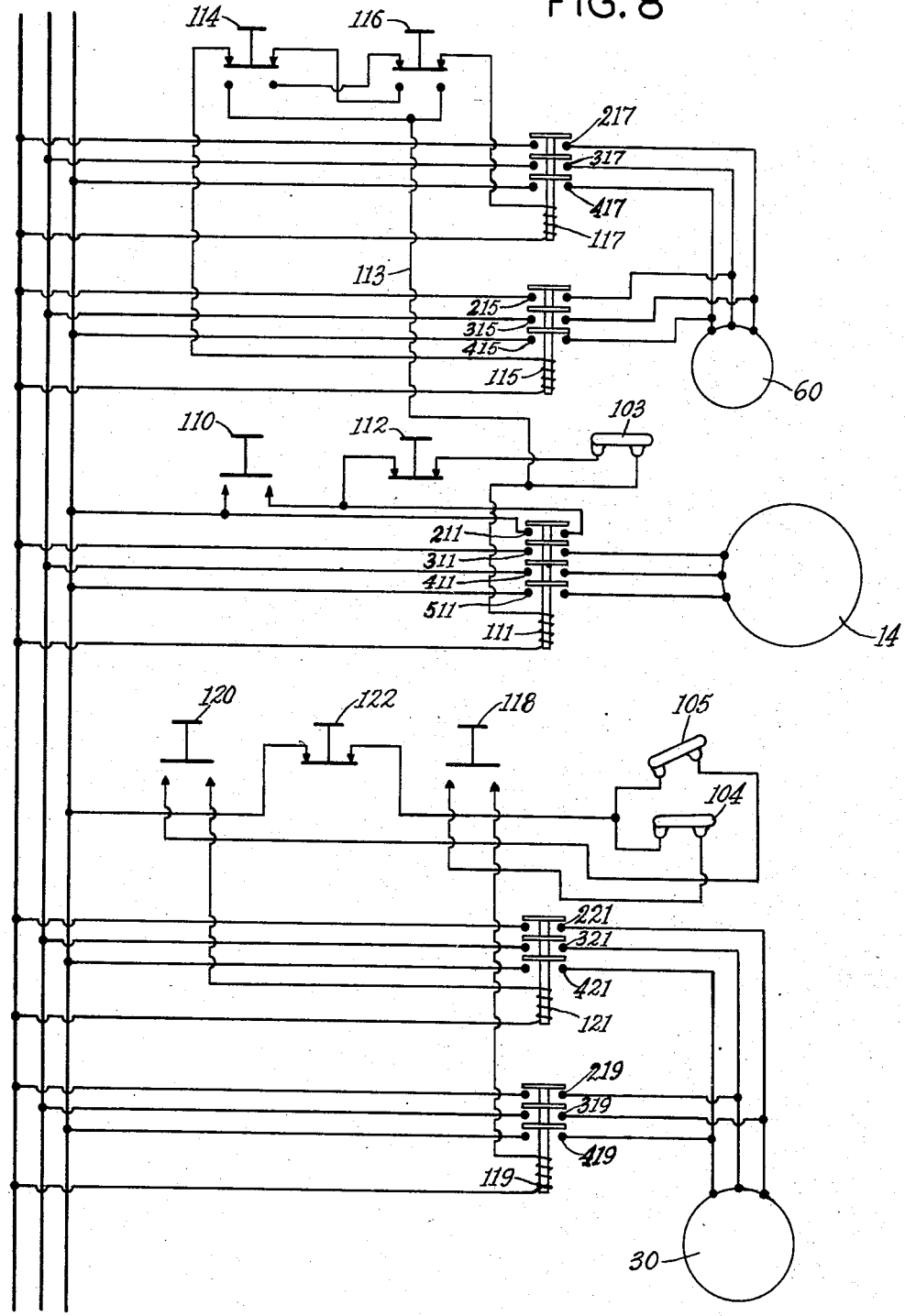
Fig. 8 is a schematic wiring diagram of the electric control for the bowl, beater and the beater speed changing motors.

Referring to Fig. 8, there is illustrated a wiring diagram for the beater motor 14, the bowl elevating motor 30 and the variable speed change motor 60 which are connected to the lines $L^1$, $L^2$ and $L^3$.

The depressing of push button 110 energizes relay 111, the same being maintained by contacts 211, which through contacts 311, 411 and 511 starts the beater motor 14. The depressing of push button 112 stops the motor. Motor 14 is also stopped automatically by the descent of the bowl saddle 29 prior to upward movement of head 11 as described hereinbefore.

The relays of the variable speed change motor 60, are connected to the beater motor relay by a wire 113 in order that the speed change motor 60 cannot be started unless the beater motor 14 is running, in order to prevent buckling and breaking of the belt 23 and its associated driving mechanism which might occur if the relatively heavy beater rotating element 26 were stationary due to the inertia of the same. Depressing the push button 114 energizes the relay 117, which through contacts 217, 317 and 417 starts motor 60 which through its drive turns the screw 59 (Fig. 2) and adjusts the pulleys 21 and 22 to retard the speed of beater head 27. Depressing of the push button 116 energizes a relay 115 which through contacts 215, 315 and 415 operates the motor 60 in the reverse direction resulting in increasing the speed of the beater head.

When the push button 118 is depressed it energizes a relay 119 which through contacts 219, 319 and 419 starts the motor 30, which through gearing previously described, lowers the bowl 28 and the bowl having reached its lowermost position then permits head 11 to be raised. When head 11 has reached a predetermined height the trip 94 has tilted the arm 97 sufficiently to break the mercury switch contact 104 thus automatically stopping the ascent of the head. When the bowl has descended, a predetermined distance, trip 93 tilts arm 96 thus breaking the mercury switch contact 103 of the beater motor circuit, thus de-energizing the relay 111 and stopping motor 14 and beater head 27.

The depressing of push button 120 energizes relay 121 which through contacts 221, 321 and 421 operates the motor 30 in the reverse direction, whereby the head 11 descends to its original position and the bowl raised to its up or mixing position at which time the mercury switch contact 105 is broken thereby stopping motor 30. Whenever push button 122 is depressed, it stops the motor 30.

The mechanism above described may be varied in construction within the scope of the claims for the particular device selected to illustrate the invention is but one of many possible concrete embodiments of the same. The invention is not, therefore, to be restricted to the precise details of the structure shown and described.

What is claimed is:

1. In a mixing machine, a support for a mixing receptacle, a head, a mixer mounted thereon for mixing movement in said head, mechanism for lifting said support, driving means for rotating said mixer, control means for incapacitating said mechanism for limiting the upward movement of said support, said mechanism also operating to lower said head, means operating as said support approaches the limits of its upward movement for setting said driving means for operation and means for operating said driving means.

2. In a mixing machine, a bowl support, a head, a mixer mounted for rotation in said head, driving mechanism for raising and lowering said support and head, control means for incapacitating said mechanism to limit the upward movement of said support, control means for incapacitating said mechanism to limit the downward movement of said head, and means for preventing rotation of said mixer until said support has traveled a predetermined distance in its upward movement toward said head.

3. In a mixing machine, the combination with a bowl support and a mixing bowl located thereon, of a movable head, a beater rotatably mounted in said head, mechanism for moving said head a predetermined distance towards said bowl, and for subsequently moving said support upward to position said mixer in said bowl, said mechanism comprising a spindle connected to said support, a rotating sleeve carried by said head, a nut connected to said sleeve and engaging said spindle and selective means for controlling the direction of rotation of said sleeve.

4. In a mixing machine, the combination with a support for a mixing bowl, of means for raising and lowering said bowl within predetermined limits, said means comprising spindles connected to said support for vertical movement therewith, and means cooperating with said spindles to yieldingly lower said support to its lowermost limit.

5. In a mixing machine, the combination with a support for a mixing bowl, of means for raising and lowering said support and bowl within predetermined limits, said means comprising said spindles connected to and movable vertically with said support, means cooperating with spindles to yieldingly lower said support to its lowermost limit, said means comprising collars secured to the lower extremity of said spindles, pins located for vertical movement relative to said collar and springs interposed between said support and collars for absorbing the shock of the support descent.

6. In a mixing machine, the combination with a bowl support and a bowl thereon, of a head, a beater rotatably mounted in said head, means for driving said beater, a device for controlling the speed of rotation of said beater including a speed adjusting element and associated operating mechanism, and means for preventing operation of said device until said beater driving means is rotating said beater.

7. In a mixing machine, the combination with a bowl support having a mixing bowl located thereon, of a head, a beater mounted in said head, driving means for rotating said beater, a device for controlling the speed of rotation of said beater including associated speed adjusting elements, a motor for regulating the relative positions of said elements, and means preventing energization of said motor until said beater is rotating.

8. In a mixing machine, the combination with a bowl support having a mixing bowl located thereon, of a head, a beater mounted in said head, driving means for rotating said beater, a device for controlling the speed of rotation of said beater including associated speed adjusting elements, a motor for regulating the relative positions of said elements, means preventing energization of said motor until said beater is rotating, and selective means for determining the direction of rotation of said motor to increase or decrease the speed of said beater.

9. In a mixing machine, mechanism for effecting positive movement of a beater head and a mixing bowl to and from each other, said mechanism comprising threaded members associated with said bowl and head, control devices operating automatically to stop the movement of said head and bowl at various stages of their movement, said devices including a control shaft, a source of power, automatic switches mounted to control said source of power and means located on said shaft to trip said switches and interrupt the motion of said bowl and head.

10. In a mixing machine, the combination with a movable beater supporting head and a mixing bowl support, of mechanism for moving said head and support towards and from each other, said mechanism comprising a threaded spindle connected to said support and travelling therewith, a rotary sleeve carried by said head, driving means fixed to said sleeve and engaging said spindle, and means for rotating said sleeve to move said support and head.

11. In a mixing machine, the combination with a movable beater supporting head and a mixing bowl support, of mechanism for moving said head and support towards and from each other, said mechanism comprising a threaded spindle connected to said support and travelling therewith, a rotary sleeve carried by said head, driving means fixed to said sleeve and engaging said spindle, means for rotating said sleeve to move said support and head, and selective mechanism for controlling the direction of rotation of said sleeve.

12. In a mixing machine, driving mechanism for successively moving a beater and a mixing bowl vertically towards and from each other, means associated therewith defining limits in the distance to be traveled by said beater and bowl towards and from each other, said means comprising a shaft driven from said mechanism, and a plurality of automatic controls operated by said shaft for stopping the movements of said beater and bowl when said limits are reached.

13. In a mixing machine, driving mechanism for moving a beater and a bowl toward and from each other, means associated therewith for limiting the upward limit of movement of said beater and the upward movement of said bowl toward said head, said means comprising a shaft driven by said mechanism, a control arm fixedly secured to said shaft for controlling the limit of said beater, and a control arm adjustably secured to said shaft for varying the upper limit of movement of said bowl.

14. In a mixing machine, driving mechanism for moving a beater and a bowl toward and from each other, means associated therewith for limiting the upward limit of movement of said beater and the upward movement of said bowl toward said head, said means comprising a shaft driven by said mechanism, a control arm fixedly secured to said shaft for controlling the limit of said beater, a control arm adjustably secured to said shaft for varying the upper limit of movement of said bowl, and switches operated by said arm for automatically terminating the vertical movement of said beater and bowl.

15. In a mixing machine, the combination with mechanism for moving a bowl carrying saddle and a head supporting a rotary beater to and from each other, of means for controlling the upward movements of said head and saddle and the rotation of said beater, said means comprising a control shaft, a plurality of control members mounted on said shaft and means actuated by movement of said members for effecting termination of the movement of said head, saddle and beater.

16. In a mixing machine, the combination with mechanism for moving a bowl carrying saddle and a head supporting a rotary beater to and from each other, of means for controlling the upward movements of said head and saddle and the rotation of said beater, said means comprising a control shaft, a plurality of control members mounted on said shaft, means actuated by movement of said members for effecting termination of the movement of said head, saddle and beater, and means for reversing the rotation of said shaft.

17. In a mixing machine, the combination with a bowl carrying saddle and a head supporting thereon a rotary beater, and means for effecting movement of said saddle and head towards and from each other, of mechanism for controlling the upper limits of movement of said head and saddle and terminating the rotation of said beater, said mechanism comprising a shaft, members controlling the upward movement of said saddle and rotation of said beater adjustably mounted on said shaft, a member controlling the upward movement of said head fixedly secured to said shaft and means actuated by the movement of said members for effecting the termination of said movement of said head, saddle and beater.

18. In a mixing machine, mechanism for controlling the rotation of a beater, said means comprising a shaft, a control member mounted on said shaft, means for driving said shaft clockwise or counterclockwise and means actuated by said member for starting or stopping the rotation of said beater.

19. In a mixing machine, the combination with mechanism for moving a bowl supporting saddle and a head mounting a rotary beater to and from each other, of control means for limiting the upward movement of said head and said saddle, additional means for controlling the rotation of said beater, said means comprising a shaft, means for driving said shaft clockwise or counterclockwise, members mounted on said shaft when driven in one direction to stop the upward movement of said head and the rotation of said beater and a member also mounted on said shaft for stopping the upward movement of said saddle on the reverse movement of said shaft, said motion of said shaft setting said beater control for operation of said beater.

20. A mixing machine of the vertical type comprising a lower frame provided with a base and two spaced uprights mounted thereon, guides supported by said base and uprights, a bowl saddle mounted on said guides for vertical movement relative to said base, an upper frame having spaced depending legs located to contact the tops of said uprights also mounted on said guides, interconnected driving means secured to said saddle for effecting raising and lowering of said saddle and upper frame, a rotary beater carried in said upper frame and means for operating said driving means to position said beater in said bowl.

21. A mixing machine, comprising a lower frame provided with a base and two spaced members extending upward therefrom, guides mounted on said base, a bowl saddle slidably supported on said guides, an upper frame comprising spaced vertically depending arms occupying positions complementary with the upper portions of said members, a rotary beater carried by said upper frame, driving means for moving said saddle and upper frame to and from each other, means for rotating said beater in said bowl, and means for controlling the speed of rotation of said beater.

22. A mixing machine comprising a lower frame provided with a base and two uprights extending upwardly therefrom, a bowl saddle mounted for vertical movement in said frame, an upper frame including a head provided with spaced depending legs movable vertically to and from said base, said legs when said frame is lowered being operative to contact the tops of said uprights for preventing further downward movement of said head, and means acting subsequent thereto for raising said saddle and a bowl thereon a predetermined distance to locate said bowl for mixing operations.

23. A mixing machine comprising a lower frame provided with a base and two uprights extending upwardly therefrom, a bowl saddle mounted for vertical movement in said frame, an upper frame including a head provided with spaced depending legs movable vertically to and from said base, said legs when said frame is lowered being operative to contact the tops of said uprights for preventing further downward movement of said head, means acting subsequent thereto for raising said saddle and a bowl thereon a predetermined distance to locate said bowl for mixing operations, and members carried by the legs of said upper frame having telescoping movement into and out of said uprights.

24. A mixing machine comprising a lower frame provided with a base and spaced uprights rising therefrom, a bowl saddle mounted for vertical movement in said frame, an upper frame member provided with depending arms having a telescoped relation to said uprights and relatively movable therein, guide members common to both frames, a bowl supporting saddle movable vertically on said guides in said lower frame, a mixing device rotatably mounted in said upper frame, and means for moving said upper frame and said saddle on said guides to locate said beater in a bowl for mixing.

25. A mixing machine comprising a frame having telescoped members, one of said members comprising a head and a rotary beater mounted in said head, the other of said members comprising a base, a bowl saddle mounted in said base for vertical movement to and from said beater, and means for moving said head and said saddle to locate said beater in a bowl on said saddle.

26. A mixing machine comprising a lower frame, including a base and spaced uprights extending upwardly therefrom, vertical guides mounted on said base, a bowl saddle slidably supported on said guides, an upper frame mounted for vertical movement on said guides, and provided with depending arms aligned with said uprights, means for lowering said upper frame until said arms engage the top of said uprights, means for raising said saddle, and stops mounted on said uprights for limiting the upward movement of said saddle.

27. In a mixing machine, a bowl support, a beater supporting head, spaced vertical guides movably mounting said support and head for movement to and from each other, mechanism for effecting positive movement of said beater head and said mixing bowl on said guides to and from each other by separate independent movements, said mechanism comprising interconnected and associated driving elements, including threaded members associated with said bowl support and head, and devices cooperating with said mechanism and operable automatically to control said members and stop the movement of said head and bowl support at various stages of said movements.

28. In a vertical mixing machine, a lower frame, a saddle for a mixing receptacle mounted for vertical movement in said lower frame, an upper frame, means for slidably supporting said upper frame on said lower frame for vertical movement relative to said lower frame, a rotatable mixing device carried by said upper frame, and interconnected driving mechanism operative to lower said upper frame and raise said saddle to locate said device in mixing position in said receptacle.

29. In a vertical mixing machine, having a support, a mixing bowl adapted to be located on said support, a head, a beater rotatably carried by said head, and means for rotating said beater in said bowl, mechanism for varying the speed of rotation of said beater in said bowl, comprising complementary pulleys, one of which is movable towards and from the other, a threaded driving rod, a nut on said rod, speed change operating connections between said nut and movable pulley, means for rotating said rod clockwise or counterclockwise to effect a change in speed of rotation of said beater, and means for preventing the operation of said mechanism until said beater has been set into rotation.

30. In a mixing machine, the combination with a mixing bowl support having a bowl located thereon, of a vertically movable head, a rotating beater mounted in said head, and power driven mechanism for automatically moving said support and head vertically towards and from each other within predetermined limits, including means for lowering said head to its lowermost limit and for also subsequently raising said support to its upper limit to position said beater in said bowl.

31. In a mixing machine, a base, bowl supporting means rising from said base, a bowl saddle carried by said means and mounting a bowl thereon, a head movable relative to said saddle, a mixing device carried by said head, and interconnected power driven mechanism for automatically moving said bowl saddle and device by independent movements towards and from each other.

32. In a mixing machine, driving mechanism for successively moving a beater and a mixing bowl vertically towards and from each other, and means associated therewith defining limits in the distance to be travelled by said beater and bowl towards and from each other, said means comprising a plurality of automatic controls for stopping the movements of said beater and bowl when said limits are reached.

WALTER F. DEHUFF.